US010016863B2

(12) United States Patent
Uhlmann et al.

(10) Patent No.: US 10,016,863 B2
(45) Date of Patent: Jul. 10, 2018

(54) MACHINE ASSEMBLY, PRODUCTION MACHINE WITH MACHINE ASSEMBLY, USE AND METHOD FOR PRODUCING ROTATION COMPONENTS

(71) Applicants: FRAUNHOFER-GESELLSCHAFT ZUR FÖRDERUNG DER ANGEWANDTEN FORSCHUNG E.V., Munich (DE); TECHNISCHE UNIVERSITAT BERLIN, Berlin (DE)

(72) Inventors: Eckart Uhlmann, Kiebitzreihe (DE); Joerg Essmann, Berlin (DE); Dirk Oberschmidt, Oranienburg (DE); Frederik Mahr, Berlin (DE); Frank Herfert, Berlin (DE); Mitchel Polte, Berlin (DE)

(73) Assignees: FRAUNHOFER-GESELLSCHAFT ZUR FORDERUNG DER ANGEWANDTEN FORSCHUNG E.V., Munich (DE); TECHNISCHE UNIVERSITAT BERLIN, Berlin (DE)

( * ) Notice: Subject to any disclaimer, the term of this patent is extended or adjusted under 35 U.S.C. 154(b) by 490 days.

(21) Appl. No.: 14/646,762

(22) PCT Filed: Nov. 20, 2013

(86) PCT No.: PCT/EP2013/074287
§ 371 (c)(1),
(2) Date: May 22, 2015

(87) PCT Pub. No.: WO2014/079883
PCT Pub. Date: May 30, 2014

(65) Prior Publication Data
US 2015/0328732 A1    Nov. 19, 2015

(30) Foreign Application Priority Data
Nov. 23, 2012   (DE) .................. 10 2012 221 484

(51) Int. Cl.
*B23Q 1/00*         (2006.01)
*B23Q 1/52*         (2006.01)
(Continued)

(52) U.S. Cl.
CPC ............... *B23Q 1/527* (2013.01); *B23B 3/06* (2013.01); *B23Q 5/10* (2013.01); *B23Q 39/026* (2013.01);
(Continued)

(58) Field of Classification Search
CPC ........ B23Q 3/00; B23Q 1/527; B23Q 39/026; B23Q 2039/008; B23B 3/06; B23B 5/28; B23B 5/00; B23B 5/08; B23K 37/053
See application file for complete search history.

(56) References Cited

U.S. PATENT DOCUMENTS 727,413 A  *  5/1903  McCracken ............... B23B 5/28
                                                  82/104
3,516,681 A  *  6/1970  Cox ....................... B23B 31/305
                                                  279/4.02
(Continued)

FOREIGN PATENT DOCUMENTS

DE       19 14 104       3/1970
DE       3247586         7/1983
(Continued)

*Primary Examiner* — Will Fridie, Jr.
(74) *Attorney, Agent, or Firm* — Preti Flaherty Beliveau & Pachios LLP (57) ABSTRACT

The invention relates to a machine assembly 100 for use in a manufacturing machine 1000, in particular in a horizontal orientation of an axis of rotation D in a horizontal manufacturing machine, comprising
 a workpiece fixture 30 which is mounted on a fixture carrier 4 and has a first side 31 and a second side 32, and
 a first and a second tool holding fixture 10, 20, wherein
(Continued)

the first tool holding fixture 10 is arranged on the first side 31 of the workpiece fixture 30 and the second tool holding fixture 20 is arranged on the second side 32 of the workpiece fixture 30. According to the invention it is provided that the workpiece fixture 30 has a main spindle 33 with an axis of rotation D running from the first to the second side 31, 32, and the main spindle 33 is designed for holding a workpiece along the axis of rotation D.

30 Claims, 5 Drawing Sheets (51) Int. Cl.
*B23Q 5/10* (2006.01)
*B23Q 39/02* (2006.01)
*B23B 3/06* (2006.01)
*B23Q 39/00* (2006.01)

(52) U.S. Cl.
CPC .. *B23Q 2039/008* (2013.01); *B23Q 2210/004* (2013.01); *Y10T 82/10* (2015.01); *Y10T 82/2593* (2015.01)

(56) References Cited

U.S. PATENT DOCUMENTS

| | | | | |
|---|---|---|---|---|
| 3,540,327 A | * | 11/1970 | Mehr | B23B 3/06 279/4.08 |
| 3,542,354 A | | 11/1970 | Fitzpatrick | |
| 4,064,774 A | | 12/1977 | Maddock | |
| 4,491,307 A | * | 1/1985 | Ellefson | B23K 37/0452 269/246 |
| 4,512,223 A | * | 4/1985 | Puhringer | B23B 3/06 82/124 |
| 4,813,311 A | | 3/1989 | Hebbrüggen | |
| 4,973,823 A | * | 11/1990 | Benway | B23K 37/0533 219/161 |
| 5,115,546 A | * | 5/1992 | Mitsukuchi | B23B 3/06 29/27 C |
| 5,943,750 A | * | 8/1999 | Koren | B23Q 37/00 29/26 A |
| 7,810,419 B2 | * | 10/2010 | Rundell | B26D 7/02 269/156 |
| 2011/0271501 A1 | * | 11/2011 | Hopkins | B23Q 39/026 483/36 |
| 2014/0189991 A1 | * | 7/2014 | Duncan | A61C 13/0004 29/56.5 |

FOREIGN PATENT DOCUMENTS

| | | |
|---|---|---|
| DE | 3620231 | 11/1987 |
| DE | 103 49 437 | 2/2005 |
| DE | 102004019722 | 12/2005 |
| DE | 10 2011 013457 | 9/2012 |
| EP | 0440096 | 8/1991 |
| EP | 1 034 881 | 9/2000 |
| EP | 1 413 395 | 4/2004 |
| WO | WO 2012/046117 | 4/2012 |

* cited by examiner

MACHINE ASSEMBLY, PRODUCTION MACHINE WITH MACHINE ASSEMBLY, USE AND METHOD FOR PRODUCING ROTATION COMPONENTS

The invention relates to a machine assembly for use in a manufacturing machine as claimed in the preamble of claim 1. The invention also relates to a corresponding manufacturing machine with the machine assembly and to the use of same and to a method for manufacturing rotational components.

A manufacturing machine within the context of this application should generally be understood as meaning a machine tool which transfer geometrically defined workpieces according to a predetermined manufacturing sequence from an initial state into a determined intermediate sequence or other manufacturing state by interaction of tools or similar manufacturing means of a tool holding fixture. A manufacturing machine can be used for machining metal, wood, glass, plastics, ceramics, etc. Customarily, materials can be machined with sometimes identical or sometimes different manufacturing machines which correspond to the particular properties of said materials; in particular, it may have proved necessary up to now in this respect to rechuck a workpiece in a workpiece fixture, i.e. to take said workpiece out and reinsert it into the workpiece fixture.

In principle, a base surface and top surface of workpieces having any outer contour, preferably cylindrical outer contour, should be machined sequentially. In this case, first of all one side is machined, subsequently the workpiece is rechucked, and then the second side is machined from the same working direction as the first side has already been machined. This also affords an advantage for base and top surfaces which are to be machined symmetrically since then a tool guide for the base surface and top surface can basically be identical. For example, classic jaw chucks or vacuum clamping chucks are used for the clamping.

However, during the material-removing machining, in particular the high precision and ultraprecision chip-removing machining with a geometrically defined cutting edge on a base surface and top surface of workpieces having any outer contour, preferably cylindrical outer contour, repeated rechucking causes a high error potential in the high precision and ultraprecision range; this may affect, for example, dimensional and geometrical accuracy. Furthermore, there is a very high outlay on tooling for calibrating a workpiece, in particular when the positions of contour elements on base surface and top surface have to coincide.

Disadvantages of the single-sided machining, in particular in the abovementioned high precision and ultraprecision range, may also include the following:
  Clamping errors due to the sequential clamping (deformation in all directions),
  Entrainment of existing geometrical errors in the respective machining of a side,
  Lengthy idle times due to calibrating and tooling operations,
  Virtually uncontrolled parallelism of the workpiece sides.
  Fundamental machining limitations can also be provided in the case of single-sided machining. For example, fixing of freeform surfaces is virtually impossible or a correlation of geometrical elements of the one side in each case with the other side in each case is possible only to a limited extent.

For particular applications, it is indeed known to machine a workpiece from a plurality of sides. For example, DE 10 2009 052 070 A1 discloses an apparatus for double-sided machining of semiconductor wafers, wherein an upper and a lower working disk with a working gap formed therebetween for holding the semiconductor wafer known; the working disks have leadthroughs for liquid working agent.

Also, for example, "multitask machines" are known which are equipped with one, two or more turrets for exchangeable tools and which make it possible to machine a workpiece from a plurality of sides with stationary or rotating tools.

Also, in addition to the classic serial kinematic system with serial buildup of individual advancing movements—which build up on one another sequentially—, a machine assembly with a "parallel kinematic system", such as, for example, "hexapods" or the like, which make it possible to orient a workpiece in a wide variety of ways with respect to a tool, is also known.

However, all of these approaches may likewise have accuracy problems.

DE 10 2009 025 726 A1, for example, discloses a method and an apparatus for incremental sheet metal forming, in which a sheet metal blank clamped in a retaining apparatus is successively formed by local plastic forming by means of a tool which is movable relative to the sheet metal blank; for this purposes, at least two tools which are spaced apart from each other and are movable with respect to each other are provided, the tools simultaneously forming the sheet metal blank in at least two forming zones which are separate from each other, with the tools preferably being opposite each other.

DE 507 375 discloses a machine tool for producing turned recesses of preferably V-shaped cross section in bores of workpieces. For this purpose, the use of two tools which are arranged coaxially, operate counter to each other and are fed from the end walls of the workpiece is provided. The workpiece is held for this purpose in a clamping apparatus.

It is basically known from U.S. Pat. No. 3,542,354 or U.S. Pat. No. 3,516,681 to hold a workpiece in a bushing which is under mechanically applied pressure or in a bushing which is placed under pressure with a fluid pressure medium. It is basically known from U.S. Pat. No. 3,762,730 to hold a workpiece on a spline arbor.

While the basic approach of two-sided workpiece machining with a first and a second tool holding fixture according to the type mentioned at the beginning is promising per se, it has nevertheless been shown that the previous embodiments of an assembly geometry and assembly kinematic system, in particular tool and/or workpiece kinematic system, are still worthy of improvement. This is true in particular with regard to the abovementioned accuracy disadvantages; the latter have not been taken into consideration to date. It is desirable to improve accuracy in two-sided workpiece machining even further.

This is the starting point of the invention, the object of which is to specify an apparatus and a method by means of which two-sided workpiece machining is possible with substantially increased accuracy. In particular, errors due to deformation geometries, especially parallelism and plane errors, are intended to be avoidable in an improved manner. In particular, in the case of the apparatus and the method, the workpiece is intended to be able to be held in an improved manner. In particular, a machining geometry and/or machining kinematic system is intended to be implemented in an improved manner in the case of the apparatus and the method.

The object relating to the apparatus is achieved by the invention with a machine assembly of claim 1. The invention also leads to a manufacturing machine of claim 22. In particular, the manufacturing machine is in the form of a machine tool. The machine tool is particularly preferably designed for joining, separating, deforming, but also optionally for coating and for changing material properties.

The invention also leads to use of the machine assembly according to the invention and/or of the manufacturing machine according to the invention for producing a workpiece, in particular with particularly high accuracy requirements.

The workpiece is preferably formed as a beam-guiding disk for beam guidance of a beam-guiding device. The beam-guiding disk can be in particular part of light optics or particle optics, such as electron optics, isotope optics, elemental particle optics or other particle optics of the beam guidance of the beam-guiding device (for example an accelerator). The part is preferably a two-sided machined lens, for example a germanium lens for infrared applications.

In the case of the machine assembly mentioned at the beginning, it is provided according to the invention that the workpiece fixture has a main spindle with an axis of rotation running from the first to the second side of the workpiece fixture, said main spindle being designed for holding a workpiece along the axis of rotation.

Building on the fundamentally advantageous kinematic principle of two-sided workpiece machining, the workpiece is therefore placed at a central position of the machine assembly and, provided with advantage by means of the main spindle, is mounted particularly securely and at the same time rotatably; this is in particular also of advantage for machining comparatively hard workpiece materials in which the machining forces are to be of appropriate magnitude. It has been shown that a mounting, in particular a rotating mounting, in accordance with the kinematic system according to the invention with the main spindle is capable of withstanding particularly high forces with high accuracy requirements demanded in the high precision and ultraprecision range.

The invention has recognized that a main spindle in the workpiece fixture, the spindle being oriented with the axis of rotation thereof from the first to the second side of the workpiece fixture, is particularly readily suitable for improving accuracy; the spindle axis points in particular in the same direction as the rotation axis of the workpiece.

In particular, a feeding direction of the first and/or second tool can run parallel to the axis of rotation; in such a development, obliquely acting forces or the like are advantageously substantially avoided.

In particular, the machine assembly and the manufacturing machine according to the concept of the invention are suitable for realizing separating machining, in particular material-removing and/or chip-removing machining of the workpiece. The advantages of the concept of the invention are realized in particular in the case of rotational components, in particular cylindrical or other rotationally symmetrical or angle of rotation symmetrical components or like workpieces. In particular, the concept of the invention has proved successful for cases in which high planarity and collinear orientation of a base and top surface have to be guaranteed during cutting or chip-removing or other material-removing machining at the workpiece; in particular, this advantage is demonstrated when the manufacturing of workpieces for scientific plants is involved.

Nevertheless, the concept of the invention is not limited to the particularly preferred exemplary embodiments mentioned above and can be used in manufacturing machines and materials of the general type mentioned at the beginning.

The concept of the invention for achieving the object in respect of the method also leads to a method of claim 24. The method can be realized in particular independently of the type or a modification of the machine assembly according to the invention; said method can nevertheless be realized particularly advantageously with the machine assembly according to the invention. The concept of the method permits comparatively high accuracy in the machining of rotational components.

According to the invention, the following steps are provided:

Rotating the workpiece about the axis of rotation by means of the main spindle;

Feeding a first tool of the first tool holding fixture and a second tool of the second tool holding fixture along the axis of rotation;

Advancing the workpiece by advancing the main spindle and/or at least one of the first and second tools.

An advancing direction is preferably oriented perpendicularly to a feeding direction.

Overall, with the machine assembly according to the invention or manufacturing machine and the method, the concept of the invention affords the provision of comparatively high flexibility in the type of machining (tool choice, feeding and advancing operations, etc.). In addition, the concept proves to be comparatively simple and therefore safe and rapid in the handling. Accordingly, a machining operation of the workpiece can be carried out at comparatively high speed and, according to the invention, proves superior over previous approaches in particular when used for a beam-guiding disk. This is of considerable advantage in particular in the case of high piece numbers and automated machining of a workpiece or of a multiplicity of workpieces.

Advantageous developments in the invention can be gathered from the dependent claims and in detail specify advantageous possibilities of realizing the above-explained concept within the scope of the statement of the object and in respect of further advantages.

Within the scope of a particularly preferred development, the main spindle has a rotatable hollow shaft, in the interior of which the workpiece can be held; in particular, provision is made in this respect for the main spindle to be in the form of the hollow shaft.

The rotatable hollow shaft is particularly preferably formed as part of a hollow shaft motor. The main spindle can therefore be realized in a particularly space-saving manner and with comparatively low retaining uncertainties; this is beneficial in particular for the accuracy requirements according to the concept of the invention. The hollow shaft can particularly preferably form a rotor of the motor, wherein the rotor is mounted in a retaining ring which surrounds the hollow shaft circumferentially and forms a stator.

In addition or alternatively, the hollow shaft can also have a fixture, such as, for example, a rotatable hollow shaft bearing clamping means or similar fixture means. In particular, such a hollow shaft which is provided with clamping means is suitable preferably for mounting in any retaining ring; preferably, but not necessarily, the retaining ring can be designed as a stator. The realization of the clamping means or of other fixture means on the hollow shaft is likewise beneficial for the accuracy requirements. For example, the main spindle can be in the form of a rotatable hollow shaft which, on a side facing the interior thereof, has the fixture means, in particular clamping means. The clamping means or similar fixture means can be feedable in particular radially in such a manner that a workpiece is secured on the axis of rotation—preferably in a self-centering manner.

Even though the abovementioned developments propose a main spindle with a preferably rotatable hollow shaft, it is nevertheless not excluded that the main spindle is also formed in a fundamentally different manner. For example, the main spindle may also have a solid shaft, on the circumference of which the workpiece can be held; in particular, for this purpose, the main spindle itself is designed as a solid shaft. A solid shaft can preferably also be part of a motor, for example, can be formed as a drive shaft of a motor on an axis of the motor.

Although the abovementioned developments preferably propose a main spindle, whether in the form of a hollow shaft or solid shaft, preferably as part of a motor, it is nevertheless also possible to drive the main spindle in another manner; for example, a peripheral drive which drives the main spindle can be provided. A drive via a belt, gearwheel or a similar mechanical drive system is possible, for example.

The main spindle can preferably have a fixture for the workpiece, which fixture has a hydraulic and/or pneumatic clamping means, wherein a hydraulic and/or pneumatic clamping means has a pressure shell for holding a pressure medium generated under piston operation. It has been shown that, with a pressure medium generated under piston operation, the workpiece can be held particularly securely and retaining forces satisfying the accuracy requirements. In addition, it is demonstrated that a piston pressure medium conveying device can be advantageously positioned in a machine assembly and/or manufacturing machine, in particular without adversely affecting accessibility to a workpiece during the machining thereof.

The pressure shell for holding the pressure medium can preferably be arranged on a clamping bushing, preferably for a hollow shaft, or on a clamping pin, preferably for a solid shaft.

The further preferred developments are produced in particular by improving advantages relating to the geometry and kinematic system of the machine assembly.

In principle, it has proven preferred for the first and/or second tool holding fixture to be designed with a series kinematic system. A series kinematic system, i.e. a serial buildup of individual advancing movements which build up sequentially one after another or are provided as an individual advancing movement of a tool holding fixture, prove particularly advantageous in respect of the accuracy requirements.

In particular, it is preferred that a first and/or second tool holding fixture is formed a feeding movement.

In a preferred first variant, it is preferred that a workpiece fixture is designed for carrying out an advancing movement.

In particular, it is preferred that the main spindle, in particular shaft, preferably hollow shaft or solid shaft, is designed to execute a cutting movement of a tool on the workpiece in a rotating manner. In principle, the cutting movement can also be any other separating movement. The concept of the invention basically makes provision for the feeding movement, main movement (cutting movement) and advancing movement to be executed by substantially independent units, by completely independent units in a first variant.

In particular, it is provided that the feeding movement of a tool is oriented along the axis of rotation of the main spindle and is oriented perpendicularly to an advancing direction of a workpiece with the tool holding fixture; it is preferably provided here that the main movement (cutting movement) is produced as a relative movement between tool and workpiece during the machining by rotation of the main spindle.

In another variant, the advancing movement of the main spindle (with workpiece relative to the tools) can be replaced by an advancing movement of the first and/or second tool, wherein the tool holding fixture is immovable (apart from the rotatability of the main spindle). While the first-mentioned variant permits greater flexibility, in particular the last-mentioned variant can be beneficial to the particularly high accuracy requirements and also to a substantially independent tool guidance independently of the main movement (cutting movement).

A fixture carrier in the form of a machine bed is preferably designed for holding a guide for at least one axis slide. An axis slide can be mounted in a guide on the machine bed with comparatively high accuracy.

It has proven advantageous, in particular in all of the abovementioned variants, to provide a linear serial kinematic system, in particular tool and/or workpiece kinematic system. Nevertheless, a different movement than a linear movement can also be provided for movement of a tool and/or workpiece; for example, a circular guide or differently curved guide. In particular, a realization of a linear movement, if preferred, of a tool can also any other axis geometry or axis arrangement in a guide (in particular also stacking of axes be possible). A linear axis, which is described by way of example with reference to the drawing, for a guide of an axis slide of a fixture can also be realized differently, in an alternative, for example in the form of a round axis or axis curved in another manner. In particular, the coupling of two or more round or curved axes can likewise realize a linear movement which, although described less elaborately in detail, should nevertheless be understood as a variant belonging to the invention.

Within the scope of a particularly preferred development, a guide for the workpiece fixture and/or for the tool holding fixture can be a linear guide and/or a curved guide, in particular a circular guide. For example, the fixture carrier can have a guide for at least one axis slide, and/or the workpiece fixture and/or the tool holding fixture can have a number of guide cylinders.

In particular, it has proven advantageous that at least one first and one second axis slide is oriented collinearly along the axis of rotation, but at least can be oriented therealong or is consistently oriented parallel thereto. This assembly geometry supporting the designed machine kinematic system is particularly preferably oriented toward machining workpieces with a base surface and top surface. In particular, it has proven advantageous that a first and second guide for the first and second axis slide are provided directly in the machine bed.

In a first modification of a development, the first and second guide can structurally form a common, in particular single-piece. guide; this is beneficial for ensuring collinearity for feeding the first and second tool with high accuracy.

In a second modification, it can be provided that the first and second guide structurally form two independent, in particular separated, guides; this nevertheless permits particularly independent and flexible guidance of the first and second tool with nonetheless comparatively high accuracy.

In general, it has proven advantageous for the first tool holding fixture to have at least one first axis slide and for the second tool holding fixture to have at least one second axis slide. Advantageously, the first axis slide of the first guide is movable in the feeding direction. Advantageously, the second axis slide is movable in the feeding direction on the second guide.

In particular within the concept of the abovementioned first modification, it has proven advantageous for the workpiece fixture to have a third axis slide which carries the main spindle. A third guide is preferably provided in the advancing direction for the workpiece fixture. This advantageously ensures a precise advancing movement of the workpiece fixture independently of feeding variants.

Within the scope of a particularly preferably realizable first development, it has proven advantageous for the fixture carrier to have a platform which is provided with a third guide for the third axis slide. This permits feeding of the tools comparatively closely to the workpiece since advancing means for the main spindle do not adversely affect the feeding means for the tools in terms of space requirement. In particular, it is provided to mount a third guide in the advancing direction in a raised manner on the platform in relation to a first and/or second guide in the feeding direction. A particularly preferred embodiment is described within the scope of the drawing with reference to FIG. 1.

In a particularly preferably realizable second development, the fixture carrier has a third guide which is level with the first and/or second guide. A particularly preferred embodiment is explained within the scope of the drawing with reference in FIG. 2. It is advantageous that this realizable development is space-saving in height and can be constructed comparatively simply.

In a preferably realizable third development, it is provided that the workpiece fixture carries the spindle directly; in particular, the fixture carrier is provided with a platform which is free from a guide. This firstly ensures the comparatively precise positioning of the main spindle with a workpiece without uncertainties which could be introduced by an advancing means. The workpiece fixture according to the third realizable development only provides the movement means for a sectional movement (main movement), i.e. the main spindle; otherwise, the platform with the fixture carrier and the main spindle is arranged comparatively centrally, in a positionally fixed manner, in the machine assembly. This arrangement is firstly beneficial for high accuracy and, furthermore, this permits not only a flexible, but also an independent guidance of the first tool by the second tool.

In particular, it can be provided that the first tool holding fixture has a first axis slide in the advancing direction and a further first axis slide in the feeding direction. In addition or alternatively, independently thereof, the second tool holding fixture can have a second axis slide in the advancing direction and a further second axis slide in the feeding direction. The axis slides of the first tool holding fixture and the axis slides of the second tool holding fixture can preferably be arranged one above the other; in particular, the further axis slide in the feeding direction is arranged below the axis slide in the advancing direction; that is to say, is arranged below the axis slide for carrying out the movement of a tool in the advancing direction.

Within the scope of a particularly preferred development, the concept of which is also explained by way of example in the drawing, a machine kinematic system permits the material-removing machining of the base surface and top surface of workpieces with any outer contour, preferably a cylindrical outer contour, in a clamp. In particular, for this purpose, the workpiece is held at a central position of the machine in a hollow shaft motor, which acts as a main spindle and preferably has a special clamping system, in a manner such that the spindle axis runs in the same direction as the rotational axis of the cylindrical workpiece.

A chip-removing tool is preferably located on a respective axis slide on both sides of the workpiece. The tool is fed to the respective workpiece side by the movement of the slide carrying the workpiece. The relative movement between tool and workpiece takes place by rotation of the workpiece in the main spindle. The advance is realized by a relative movement of the main spindle including workpiece with respect to the chip-removing tools.

Overall, the machine kinematic system which is provided in the concept, in particular according to the developments, and which is described by way of example in preferred embodiments below with reference to the drawing, affords, because of the possible, simultaneous machining of a workpiece from two sides, not only the shortening of a main time for chip removing or other machining processes. Furthermore, it is possible, in particular with the configurations described below, to produce dependent geometry by exact correlation of the tool position on two workpiece sides, namely a base surface and top surface. Furthermore, passive forces during simultaneous machining and with coinciding technological circumstances on the respectively machined workpiece surface are eliminated. This overall results in a reduction of clamping errors and in a reduction of the outlay on calibration, in particular in the case of dissimilar machining of the surfaces. Overall, the error potential of machining accuracy in the case of simultaneous and/or two-sided machining of base surfaces and top surfaces of a rotational component is reduced.

Furthermore, it has been shown that, on account of the concept explained here, in particular according to the developments, of a machine kinematic system, characteristic machining marks are produced on the workpiece, namely typically extremely fine grooves on the base surface and top surface with any outer contour, preferably a cylindrical outer contour. The machining marks have characteristics which indicate the same machining direction of a machining mark on the top side and a machining mark on the base surface. This feature of a "non-changing" direction of rotation of a machining mark (in contrast to a machining characteristic in a rechucked workpiece) also has advantages in the accuracy of machining a workpiece.

Furthermore, it is possible, in particular possible when machining thin disks with the machine kinematic system described according to the inventive concept, to achieve high plane-parallelism. By contrast, during consecutive machining with rechucking, characteristic, correlating deformations can be seen on the upper side and lower side of the workpiece (top surface and base surface), said deformations being avoided in the present case.

In this respect, the concept of the invention, as described by way of example with reference to the following three embodiments, is suitable in particular for use wherever the base surface and top surface of workpieces with any outer contour, preferably cylindrical outer contour, are intended to be machined highly or ultraprecisely.

Particularly preferred examples of any rotationally symmetrical components per se composed of any materials are plane-parallel disks, lenses and mirrors with an identical or differing geometry on the front side and rear side, for example with a plane base surface and a top surface of any shape, clockwork dials, tools and mold inserts for molding processes.

Exemplary embodiments of the invention, within the scope of medical use, are now described below with reference to the drawing in comparison to the prior art, which is likewise partly illustrated. The drawing is intended to illustrate the exemplary embodiments not necessarily to scale; on the contrary, the drawing where necessary for explanation is realized in a schematized and/or slightly distorted form. With regard to supplements of the teachings which can be seen directly from the drawing, reference is made to the relevant prior art. It should be taken into consideration here that diverse modifications and changes relating to the shape and the detail of an embodiment can be undertaken without departing from the general concept of the invention. The features of the invention disclosed in the description, in the drawing and in the claims may be essential both individually and in any combination for the development of the invention. In addition, all combinations of at least two of the features disclosed in the description, the drawing and/or the claims fall within the scope of the invention. The general concept of the invention is not limited to the exact shape or the detail of the preferred embodiment shown and described below or limited to a subject matter which appears to be restricted in comparison to the subject matter claimed in the claims. In the case of stated dimension ranges, values lying within the limits mentioned are also intended to be disclosed as limiting values and to be usable and claimable as desired. Further advantages, features and details of the invention emerge from the description below of the preferred exemplary embodiments and with reference to the drawing, in which:

For the concept of the invention of a workpiece fixture which is machinable on two sides and has a main spindle, three embodiments of a machine assembly for use in a machine tool for a separating tool as an example of a manufacturing machine are described by way of example below; the machine kinematic system is described therein by way of example with reference to a series kinematic system with different configurations of linear axes for guiding axis slides; to realize this and essentially a linear movement of a tool in a tool holding fixture.

The same reference signs are used below for identical or similar parts or parts of identical or similar function.

Figure 1:
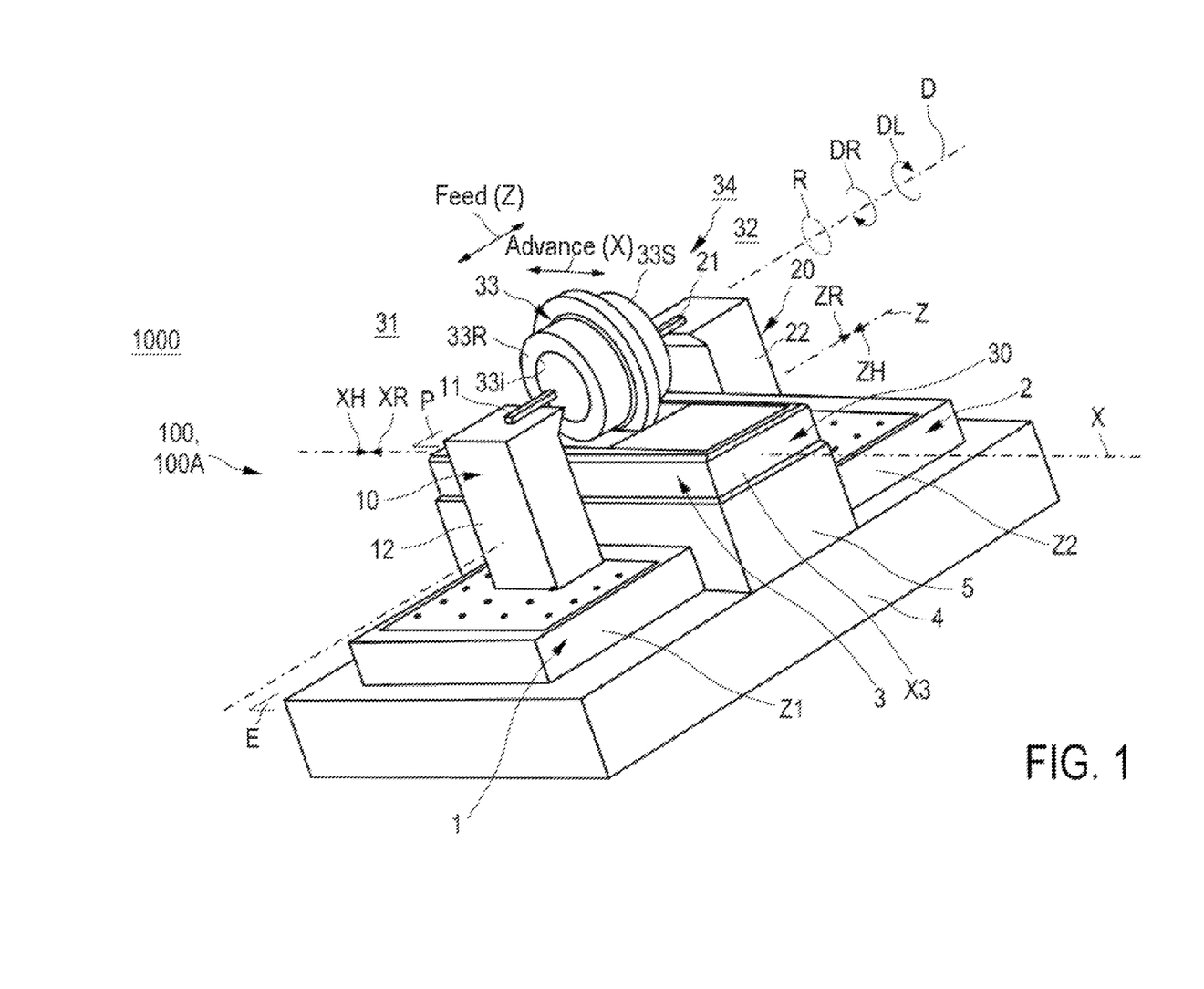
FIG. 1 shows a first embodiment of a machine assembly for use in a horizontal machine tool, in which the fixture carrier has a platform for the workpiece fixture, which platform is provided with a third axis slide which carries the main spindle.

FIG. 1 shows a machine assembly 100 of a manufacturing machine 1000 (not illustrated specifically); the manufacturing machine 1000 can furthermore have a machine frame, such as a framework or foundation for holding the machine assembly, and also corresponding driving and programming logic means for the machine assembly; for example, for controlling a rotating movement of the workpiece, a feeding movement of the tools and/or an advancing movement of the tools and of the workpiece.

Figure 2:
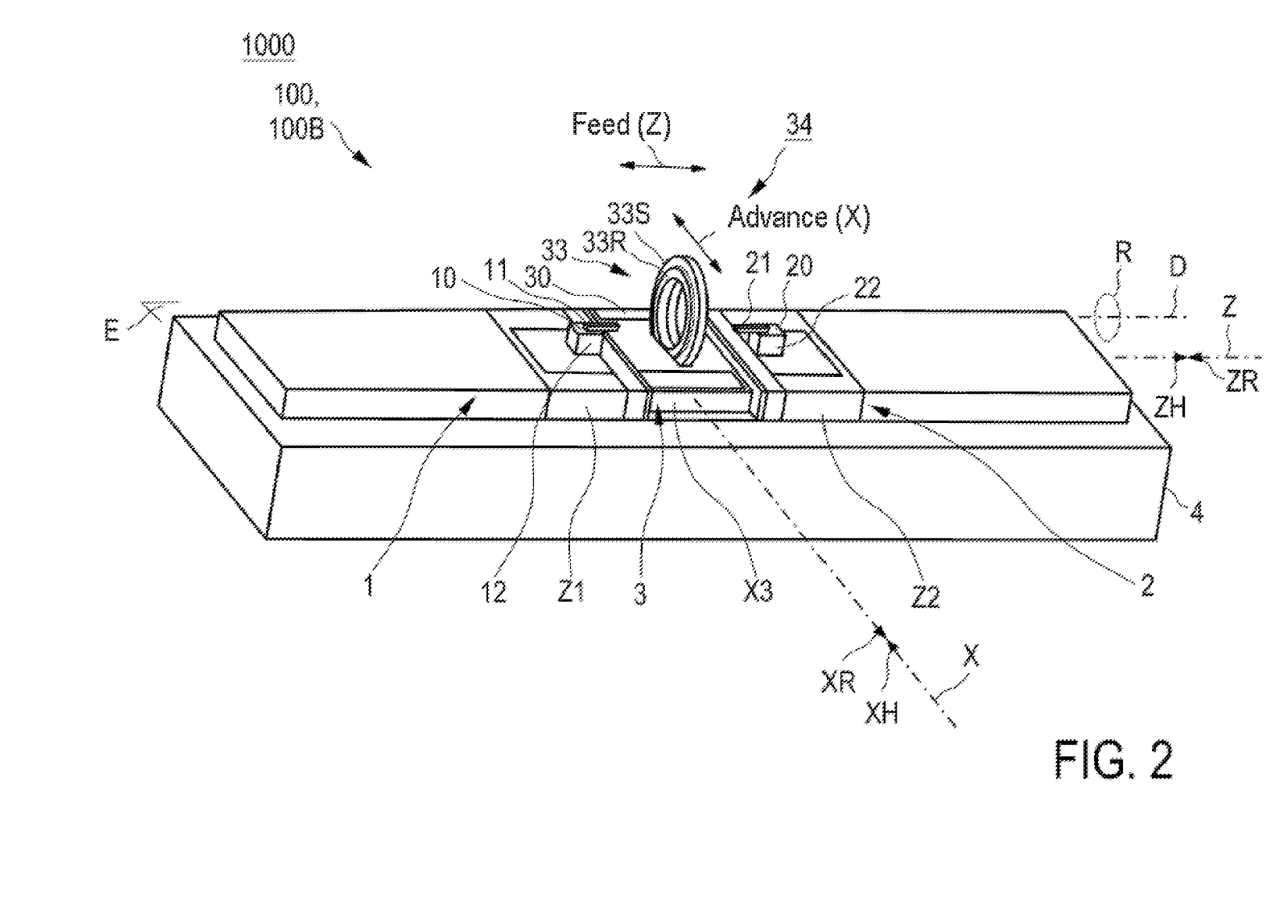
FIG. 2 shows a second embodiment of a machine assembly, in which the fixture carrier has three axis slides of a first and second tool holding fixture and a workpiece fixture, which are arranged at the same height.
Figure 3:
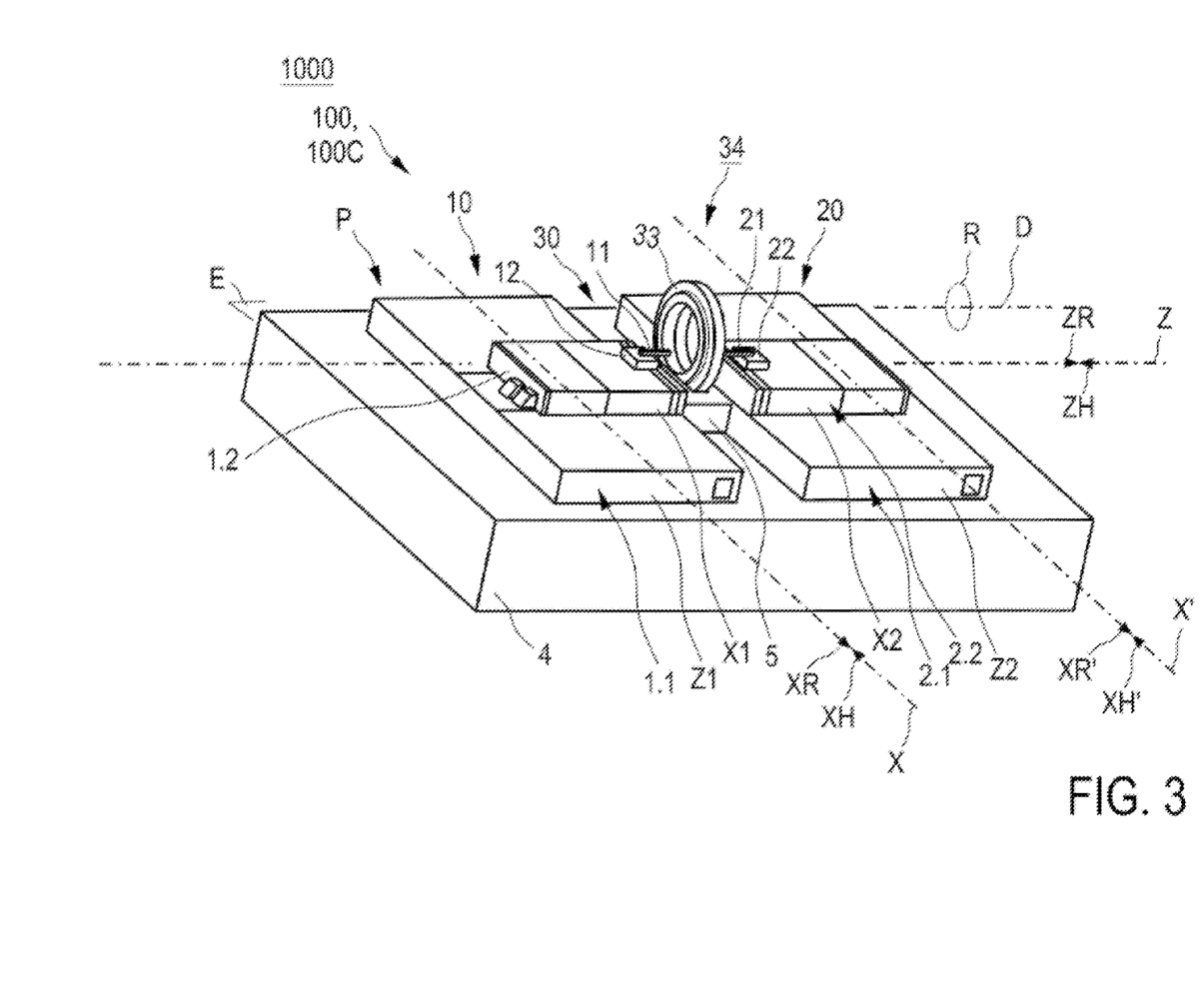
FIG. 3 shows a third embodiment of a machine assembly, in which the fixture carrier has a platform which carries a main spindle directly in order to form the workpiece fixture and is free from another guide, and wherein each of the first and second tool holding fixtures has two axis slides.

The machine assembly 100 itself is designed in particular for use in a horizontal machine tool, i.e. in a horizontal orientation, as shown in FIG. 1, FIG. 2 and FIG. 3; in principle, a realization of the concept of the invention is not limited to the use in a horizontal manufacturing machine or in a horizontal orientation of the machine assembly. The concept of a machine kinematic system with a central main spindle and tool holding fixture feedable on both sides can also be used within the scope of a vertical orientation, i.e. in a vertical manufacturing machine, or in a different orientation.

In detail, in a first embodiment 100A which is shown in FIG. 1, the machine assembly 100 has a fixture carrier 4 with a workpiece fixture 30 mounted thereon and with a first tool holding fixture 10 and with a second tool holding fixture 20, said tool holding fixtures respectively on a first side 31 and a second side 32 of the workpiece fixture 30.

In the present case, a first tool 11 or a second tool 21 of the first or second tool holding fixture 10, 20 is formed as a chip-removing or material-removing tool and, precisely in the same manner as a workpiece (not shown specifically here), these are arranged on a common axis of rotation D of the workpiece fixture 30.

Specifically, the workpiece fixture 30 has a main spindle 33 which is arranged concentrically about the axis of rotation D and has a rotatable hollow shaft 33R, in the interior of which the workpiece can be held on the axis D. In the present case, the rotatable hollow shaft 33R, as a rotatable part of a hollow shaft motor 34, namely as a rotor of the hollow shaft motor 34, is mounted in a retaining ring 33S which surrounds the hollow shaft 33R circumferentially and is designed as a stator. In the interior 33i, the hollow shaft bears fixture means (not shown specifically), here in the form of a clamping means for securing a workpiece on the axis of rotation D. This description also applies to the further embodiments 100A, 100B, 100C of a machining portal 100 that are explained with regard to FIG. 1, FIG. 2 and FIG. 3.

First of all, with further reference to FIG. 1 for the description of the embodiment 100A, the machine kinematic system for realizing the movement kinematic system of tool holding and workpiece fixtures 10, 20, 30 is formed by means of the geometry (described below) for the relative geometrical arrangement of workpiece fixture 30 and of the first and second tool holding fixtures 10, 20.

The fixture carrier 4 has a platform 5 which, in the present case, carries the workpiece fixture 30. The workpiece fixture 30 itself is formed by a third axis slide 3 mounted on the platform 5 and a main spindle 33 which is carried by said workpiece fixture and is in the form of the hollow shaft motor 34. The third axis slide 3 is designed to move in the direction of an x-axis X, which specifies the advancing direction; the third axis slide 3 is also referred to as an x-slide. The platform 5 is provided with a corresponding third guide X3 for the third axis slide 3.

In addition, the fixture carrier 4 has a first axis slide 1 on a first side 31 and a second axis slide 2 on a second side 32. The first and second axis slides 1, 2 are respectively held in a first and second guide Z1, Z2 for the axis slides 1, 2 in and/or on the fixture carrier 4. Overall, the third axis slide 3 or the third guide X3 is thus arranged raised in relation to the first and second axis slides 1, 2 or the first and second guides Z1, Z2; i.e. is located in or above the platform plane P which is raised in relation to the fixture center plane E.

The first and second axis slides 1, 2 are both movable in the direction of a z-axis Z, which indicates the feeding direction; the first and second axis slides 1, 2 are also referred to as z slides. In the present case, each of the z slides has a dedicated drive (not denoted specifically) as part of the guide Z1, Z2, namely a first drive and a second drive; the third axis slide 3 has a third drive (not designated specifically) as part of the third guide X3. In this respect, the platform 5 is also referred to as the x-axis platform.

In detail, a continuous guide, formed by the guides Z1, Z2, for carrying the z slides, namely the first and second axis slides 1, 2, is formed on the fixture carrier 4, which is formed as a machine bed. The two axis slides 1, 2 each have a dedicated drive and move to and fro or forward and back on the common guide in any direction ZH, ZR along the z-axis. A first and second fixture block 12 and 22 having corresponding connecting means on the upper region thereof in the vicinity of the axis of rotation D for a tool 11, 21 are located in each case on the thus designated z slides. In the present case, the first and second tools 11, 21 are formed in each case as a chip-removing tool.

A guide X3 along the x direction X is mounted on the platform 5 (x-axis platform) of the fixture carrier 4 orthogonally to the z guide along the z-axis Z for the first and second axis slides 1, 2; that is to say, the guide X3 of the x-axis slide 3 runs above the guide of the z-axis slides 1, 2. The third axis slide 3 is located in and/or on the third guide X3. The hollow shaft motor 34 which acts as the main spindle 33 and is in the form of the main spindle 33 is mounted in turn on said third axis slide 3.

The machine kinematic system of the machine assembly 100 in the embodiment 100A, the machine kinematic system determining the movement kinematic system of the tools 11, 21 and of the workpiece, is produced as follows.

The workpiece can be rotated about the axis of rotation D in a left or in a right direction of rotation DL, DR, i.e. in the clockwise direction or counterclockwise, by rotation of the hollow shaft 33R; this rotational movement reproduces the main movement (or also referred to as the cutting movement) of the workpiece. The tools 11, 21 can be fed along the axis of rotation D, i.e. along the z-axis in the direction ZH, or moved away in direction ZR. The machine assembly 100 described here in the embodiment 100A permits a comparatively tight feeding of the tools 11, 12 to the workpiece since the axis slides 1, 2, 3 can be placed comparatively tightly against one another.

By movement of the main spindle 33, an advance of the workpiece takes place in the x-direction X by means of the third axis slide 3 along the X guide X3. By moving the workpiece in the x-direction X with the tools 11, 21 fed thereto, an advance of the main spindle 33 is achieved, and therefore chip-removing or cutting or other material-removing machining can take place within the interior 33*i* of the main spindle 33.

The embodiment 100B which is illustrated in FIG. 2 manages without a platform 5; a third guide X3, like a first and second z guide Z1, Z2, is formed directly on the fixture carrier 4, which is formed as a machine bed. Accordingly, FIG. 2 specifically shows two guides Z1, Z2 on a machine bed for carrying the z slides in the form of the first and second axis slides 1, 2, and also a further third guide X3 for carrying the x slide in the form of the axis slide 3. Each axis slide 1, 2 has a dedicated drive and moves on the respective guide Z1, Z2, i.e. there is not a common guide as in FIG. 1, in any direction ZH, ZR. The respective tool, i.e. the first and second tools 11, 21 in the form of a chip-removing tool, is located on the z slide in the form of the first and second axis slides 1, 2. A third guide X3 for the x direction X is mounted directly on the machine bed orthogonally to the thus denoted z guides Z1, Z2; the third x guide X3 therefore runs between and level with the first and second z guides Z1, Z2. The third axis slide 3, on which the hollow shaft motor 33 acting as the main spindle is mounted, is located on the x guide itself. Said hollow shaft motor 33 moves the workpiece on the axis of rotation D in the x direction X with tools 11, 21 fed to said workpiece, and therefore chip-removing cutting can take place on the workpiece in the interior region, i.e. within the interior 33*i* of the hollow shaft motor 34. In comparison to the embodiment 100A, it is indeed not possible for the tools 11, 21 to be brought as close to the workpiece. However, the flexibility of the embodiment 100B is improved.

Whereas, in the embodiments 100A, the z slides can preferably be moved synchronously on the common guide Z1, Z2, for example, with simultaneous synchronized feeding of the tools 11, 21 to the workpiece, in the embodiment 100B, each of the axis slides 10, 20 can be moved, driven or stopped independently of the other on a dedicated guide Z1, Z2.

FIG. 3 shows a third embodiment 100C of a machine assembly 100, in which the fixture carrier 4 is again provided with a platform 5. However, the latter carries the main spindle 33 directly, i.e. is free from a guide—the main spindle 33 is mounted directly on the platform 5 and, in the present case, is thereby arranged in a positionally fixed manner concentrically about the axis of rotation D on the fixture carrier 4. The main movement of the workpiece (cutting movement) is the sole function of the workpiece fixture 30 which is capable, by means of the main spindle 33, of setting the workpiece into rotation R in a direction of a right or left direction of rotation DR, DL, i.e. in the clockwise direction or counterclockwise about the axis of rotation D.

Both feeding movement and advancing movement of the tools 11, 21 relative to the workpiece take place via the first and second tool holding fixtures 10, 20. Each of the tool holding fixtures 10, 20 has two axis slides. A first axis slide 1.1 and a further first axis slide 1.2 are arranged on a first z guide Z1 and first x guide X1, respectively. The second tool holding fixture 20 likewise has a second axis slide 2.1 and a further second axis slide 2.2 on a second z guide Z2 and second x guide X2, respectively. As already explained with reference to the embodiment 100A, 100B, the first axis slide 1.1 and the second axis slide 2.1 are responsible for the feeding movement in the feeding direction, i.e. in the z direction, for example to and fro in a direction ZH, ZR parallel to the axis of rotation D.

By contrast, the further first and second axis slides 1.2. and 2.2 along the first and second x guide X1, X2 are responsible for moving the tools 11, 21 along an advancing movement in any direction of an X1 axis and X2 axis, respectively, which are arranged parallel to each other. The third embodiment 100C described here is particularly flexible since the two advancing directions and also the two feeding directions can be controlled as desired on account of the individual, independently drivable and controllable guides Z1, Z2, X1, X2.

Specifically, in the third embodiment 100C, two guides for carrying the z slides, namely the first and second axis slides 1.1, 2.1, are mounted on the machine bed of the fixture carrier 4. Each of the axis slides 1.1, 2.1 has a dedicated drive and moves on the respective guide in any direction ZH, ZR. A guide for the x direction is in each case mounted orthogonally to the z guides on a respective x slide which, in turn, in each case has a drive and an x guide X1, X2. An axis slide which carries the respective chip-removing tool 11, 12 is located on the x guide.

The hollow shaft motor 34 acting as the main spindle 33 is mounted fixedly on the platform 5 of the machine bed. The advancing movement of the respective tool 11, 21 relative to the workpiece is realized by the X1 and/or X2 drive of the further axis slides 1.2, 2.2 while the feeding of the tools 11, 12 takes place via the drive in the guides Z1 and/or Z2 for the axis slides 1.1, 2.1.

Figure 4:
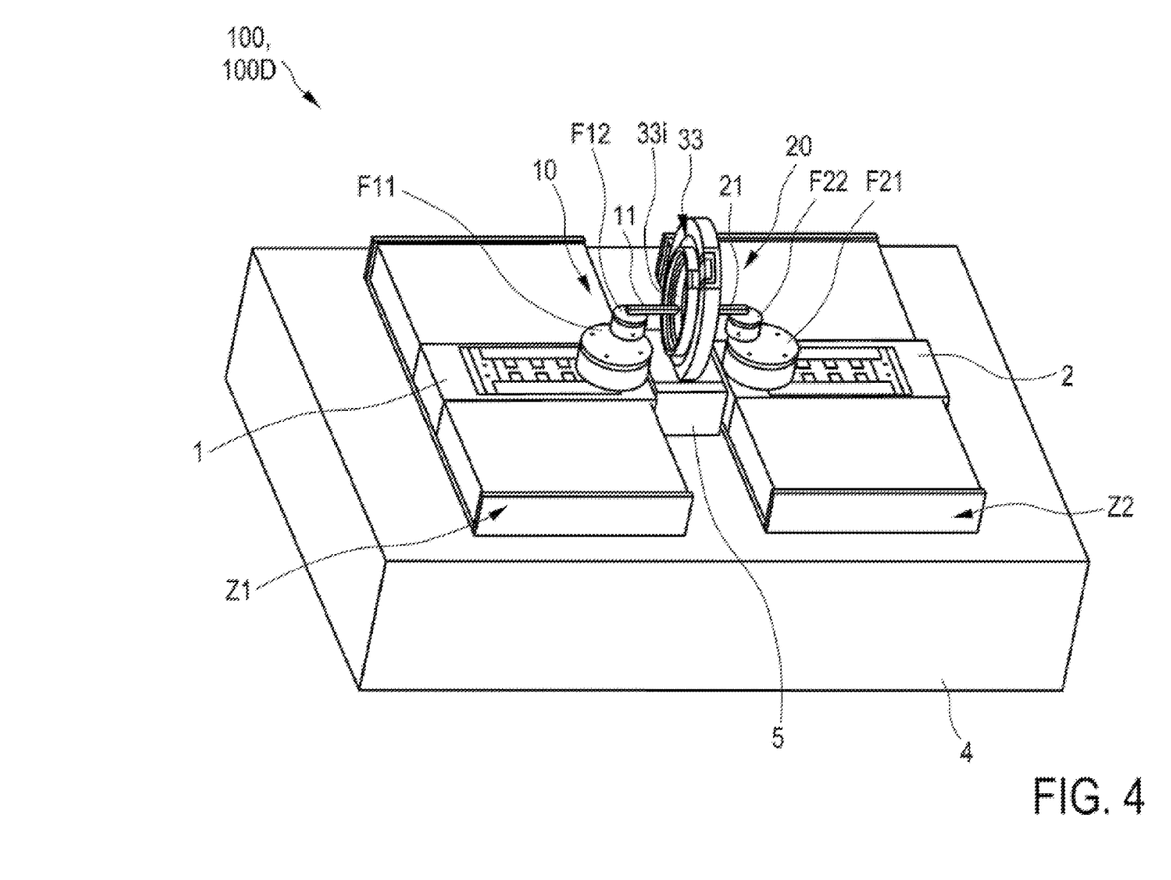
FIG. 4 shows a modification of a machine assembly, in particular building on the machine assembly shown in FIG. 3, but in principle also realizable for forming a tool holding fixture in a machine assembly of FIG. 1 or FIG. 2.

FIG. 4 shows a modified machine assembly 100 as embodiment 100D which essentially follows the principle of the embodiment 100C with a fixture carrier in the form of a platform. For the sake of simplicity, the same reference signs as previously are used for identical or similar features and features of identical or similar function. Reference is made below in particular to the varied design of the tool holding fixtures 10, 20. Each of the tool holding fixtures 10, 20 has an axis slide 1, 2 which is mounted in z direction guides Z1, Z2. The tools 11, 21 are in each case held on a stack of in each case two guide cylinders F1.1, F1.2 and F2.1, F2.2. The guide cylinders F1.1, F1.2 and F2.1, F2.2 are capable of guiding a tool 11, 21 according to the specification of a circular guide. A tool 11, 21 can therefore be placed at any point in the interior 33$i$ of the main spindle 33. Similarly to the embodiment 100C of FIG. 3, a separate guide on the platform 5 for the workpiece is superfluous in the embodiment 100D of FIG. 4. Furthermore, a circular guide with the guide cylinders F1.1, F1.2 and F2.1, F2.2 can be realized in a particularly space-saving manner, and therefore the embodiment 100D can be realized particularly compactly in comparison to the embodiment 100C.

Figure 5:
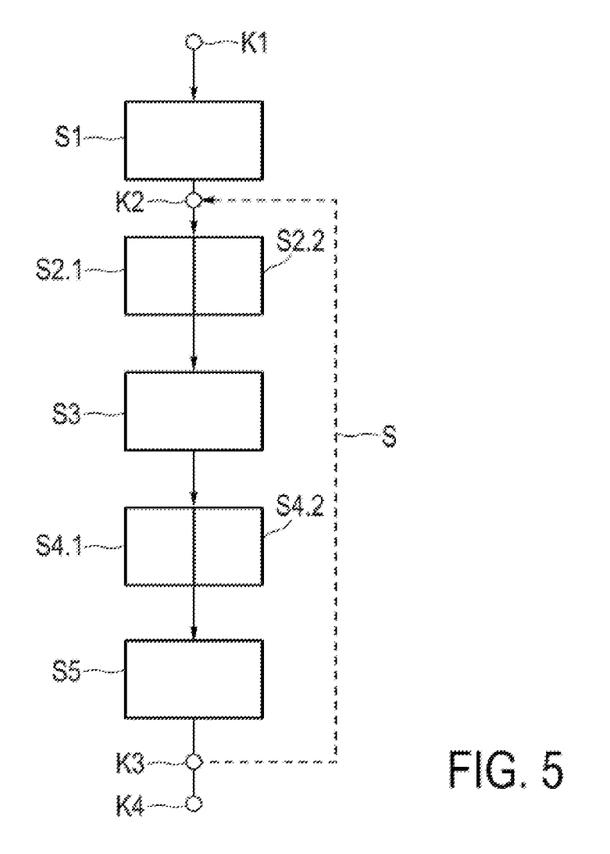
FIG. 5 shows a flow diagram of a method for manufacturing rotational components according to a preferred embodiment, in which, within the scope of a series kinematic system, the workpiece is rotated, two tools are fed thereto and the workpiece is advanced.

FIG. 5 shows schematically the sequence of a method for manufacturing rotational components in basic form and clarifies in this respect that a workpiece basically does not need to be unclamped until same has been completely finished; the method therefore ensures the substantial advantages of the concept of the invention.

Proceeding from a start node K1, a workpiece can be provided, for example, in the form of a semi-finished product or blank, preferably in the form of a rotational component, but at any rate with a certain mirror symmetry. In a first step S1, the workpiece can be held in the main spindle along the axis of rotation D and secured there by clamping.

For a suitable type of machining desired for the machining operation, a first tool 11 or a first tool holding fixture 10 can be arranged on the first side 31 of the workpiece fixture 30 in a second step S2.1, and, in a further second step S2.2, a second tool holding fixture 20 or a second tool 21 can be arranged on the second side 32 of the workpiece fixture 30. The steps S2.1 and S2.2 can be carried out by themselves or in combination and in any desired sequence.

In a third step S3, the workpiece can be set by actuation of the hollow shaft motor 34 into rotation R about the axis of rotation D, i.e. with the main spindle 33. In a sequence of steps S4.1, S4.2 which can be carried out by itself or in combination and in any desired sequence, the first and/or second tool 11, 21 of the first or the second tool holding fixture 10, 20 can be fed along the axis of rotation, i.e. by actuation of an axis slide in the z direction Z.

Thus, optionally the material-removing machining of the workpiece begins. In particular, however, the material-removing, chip-removing or other separating machining of the workpiece is possible in a step S5 by advancing the workpiece by advancing the main spindle; this can be realized as is explained with reference to the embodiments 100A, 100B and/or one of the first and second tools, corresponding to the embodiment 100C. In particular, an advancing direction X can be oriented perpendicularly to a feeding direction Z.

Subsequently, beginning at the further third node K3, a loop S can be realized to the second node K2, i.e. with repetition of steps S2.1/S2.2 to S5, i.e. optionally with exchange of the tools, restarting the rotating movement of the workpiece, refeeding S4.1, S4.2 and material-removing machining by advancing the tool in step S5. The method can be ended at step K4. The nodes K1 and K4 can be incorporated as desired into a continuing manufacturing process of the workpiece.

LIST OF REFERENCE SIGNS

4 Fixture carrier
1, 2, 3 Axis slides
1.1, 1.2, 2.1, 2.2 Axis slides
5 Platform
10, 20, 30 Tool holding fixture, workpiece fixture
11, 21 Tool
12, 22 Fixture block
31 First side of the workpiece fixture
32 Second side of the workpiece fixture
33 Main spindle
33R Hollow shaft, rotor
33S Retaining ring, stator
33$i$ Interior
34 Hollow shaft motor
100 Machine assembly
100A, 100B, 100C, 100D Embodiments of the machine assembly
1000 Manufacturing machine
D Axis of rotation
DL Left direction of rotation counter to the clockwise direction
DR Right direction of rotation in the clockwise direction
R Rotation
E Fixture center plane
F1.1, F1.2, F2.1, F2.2 Guide cylinder
K1, K2, K3, K4 Node
P Platform plane
S1, S2.1, S2.2, S4.1, S4.2, S5 Steps
X, Z x-axis (advancing direction), z-axis (feeding direction)
X1, X2, X3 Guide in the x direction, in particular with drive
Z1, Z2 Guide in the z direction, in particular with drive
ZH, ZR Direction (forward, back) in the z direction
XH, XR, XH', XR' Direction (forward, back) in the x direction/x' direction

The invention claimed is:

1. A machine assembly for use in a manufacturing machine, in particular in a horizontal orientation of an axis of rotation in a horizontal manufacturing machine, comprising:
   a fixture carrier;
   a hollow shaft motor having a rotatable hollow shaft:
      a workpiece fixture having a first side and a second side, the workpiece fixture being mounted on the fixture carrier; and
      a first and a second tool holding fixture, wherein
   the first tool holding fixture being arranged on the first side of the workpiece fixture and the second tool holding fixture being arranged on the second side of the workpiece fixture; and
   wherein:
      the workpiece fixture has a main spindle with an axis of rotation running from the first to the second side, the main spindle being configured for holding a workpiece along the axis of rotation, the main spindle having a rotatable hollow shaft configured to hold the workpiece in the interior thereof, the rotatable hollow shaft is a part of the hollow shaft motor, and the main spindle including on a side facing an interior of the rotatable hollow shaft at least one of a hydraulic and pneumatic radially feedable clamping means for securing the workpiece.

2. The machine assembly as claimed in claim 1 wherein the hollow shaft forms a rotor of the hollow shaft motor and the rotor is mounted in a retaining ring which surrounds the hollow shaft circumferentially and forms a stator, or the hollow shaft is mounted as a rotatable hollow shaft in a stator.

3. The machine assembly as claimed in claim 1 wherein the main spindle has a fixture for the workpiece, which fixture includes the radially feedable clamping means, and wherein the radially feedable clamping means has a pressure shell for receiving a pressure medium generated under piston operation.

4. The machine assembly as claimed in claim 1 wherein the first and second tool holding fixtures are part of a series kinematic system, and wherein a feeding direction of a tool is oriented along the axis of rotation of the main spindle and is oriented perpendicularly to an advancing direction of a workpiece.

5. The machine assembly as claimed in claim 1 wherein the fixture carrier has a guide for at least one of the workpiece fixture, the first tool holding fixture and the second tool holding fixture to a form a machine bed.

6. The machine assembly as claimed in claim 1 further including at least one of a linear guide and a circular guide for at least one of the workpiece fixture, the first tool holding fixture and the second tool holding fixture.

7. The machine assembly as claimed in claim 1 wherein the fixture carrier has a guide for at least one axis slide.

8. The machine assembly as claimed in claim 1 wherein the first and second tool holding fixtures are coupled to first and second axis slides, wherein the first and second axis slides are oriented collinearly along the axis of rotation.

9. The machine assembly as claimed in claim 1 further including first and second guides, wherein the first and second tool holding fixtures are coupled to respective first second guides and the first and second guides form a common guide.

10. The machine assembly as claimed in claim 1 further including first and second guides, wherein the first and second tool holding fixtures are coupled to respective first and second guides and the first and second guides form two independent guides.

11. The machine assembly as claimed in claim 1 wherein the first tool holding fixture has at least one first axis slide on a first guide movable in a tool feeding direction parallel to the axis of rotation, and the second tool holding fixture has at least one second axis slide on a second guide movable in the tool feeding direction.

12. The machine assembly as claimed in claim 11 wherein the workpiece fixture has a third axis slide which carries the main spindle, wherein the third axis slide is movable in an advancing direction generally perpendicular to the tool feeding direction.

13. The machine assembly as claimed in claim 11 wherein the fixture carrier has a platform that includes a third guide for the third axis slide, wherein the third guide is raised in relation to at least one of the first and second guides for the first and second axis slides.

14. The machine assembly as claimed in claim 11 wherein the fixture carrier has a third guide which is level with at least one of the first and the second guide.

15. The machine assembly as claimed in claim 1 wherein the workpiece fixture carries the main spindle directly.

16. The machine assembly as claimed in claim 1 wherein the fixture carrier includes a platform which is free from a guide.

17. The machine assembly as claimed in claim 12 wherein at least one of the first tool holding fixture and the second tool holding fixture includes a first slide movable in the advancing direction and a slide movable in the tool feeding direction.

18. The machine assembly as claimed in claim 1 further including a tool in at least one of the first and second tool fixtures, wherein the tool is a parting-off tool.

19. The machine assembly as claimed in claim 1 further including a machine frame, wherein the machine assembly is disposed on the machine frame.

20. A method of using the machine assembly of claim 1, the method comprising using the machine assembly to machine a workpiece, wherein the workpiece, is an optical workpiece in the form of a beam-guiding device.

21. A method for manufacturing a by means of a machine assembly as claimed in claim 1 comprising:
providing a workpiece;
holding the workpiece along the axis of rotation of the main spindle by securing the workpiece within the rotatable hollow shaft using the radially feedable clamping means;
rotating the workpiece about the axis of rotation by means of the main spindle;
feeding at least one of a first tool of the first tool holding fixture and a second tool of the second tool holding fixture along the axis of rotation in a tool feeding direction into contacting relation with the workpiece; and
advancing the workpiece with respect to at least one of the first tool and the second tool in an advancing direction generally perpendicular to the tool feeding direction by relative movement of the main spindle with respect to the at least one of the first tool and the second tool.

22. The machine assembly as claimed in claim 1 wherein:
the hollow shaft forms a rotor of a hollow shaft motor, wherein the rotor is mounted in a retaining ring which surrounds the hollow shaft circumferentially and forms a stator, or the hollow shaft is mounted as a fixture-bearing, rotatable hollow shaft in a stator;
at least one of the first and second tool holding fixtures is part of a series kinematic system, wherein a feeding direction of a tool mounted to at least one of the first and second tool holding fixtures is oriented along the axis of rotation of the main spindle and is oriented perpendicularly to an advancing direction of a workpiece;
the fixture carrier includes a workpiece fixture guide for the workpiece fixture, and first and second tool holding fixture guides to provide relative movement of the main spindle with respect to a tool mounted to the first and second tool holding fixtures, the relative movement along an axis in a direction transverse to the axis of rotation of the main spindle, wherein
the guide is one of a linear guide and curved guide;
the first and second tool holding fixture guides including at least one of an axis slide and a plurality of guide cylinders;

at least one first and one second axis slide oriented collinearly along the axis of rotation;

the first and second axis slides disposed on respective first and second tool holding fixture guides to permit linear movement of respective first and second tool holding fixtures along the feeding direction;

the workpiece fixture including a third axis slide mounted on a third guide, the main spindle mounted to the third axis slide to permit movement of the main spindle in the advancing direction; and the fixture carrier including a platform, wherein the third guide is mounted to the platform and the third guide is raised in relation to at least one of the first and second guides.

23. The machine assembly as claimed in claim 22 further including a machine frame, wherein the machine assembly is mounted to the machine frame.

24. A method of using a machine assembly as claimed in claim 22 for producing a workpiece, the method comprising machining an optical workpiece to produce a beam-guiding disk for beam guidance within a beam-guiding device.

25. A method of using a manufacturing machine as claimed in claim 19 for producing a workpiece, the method comprising machining an optical workpiece to produce a beam-guiding disk for beam guidance within a beam-guiding device.

26. A method of using a manufacturing machine as claimed in claim 23 for producing a workpiece, the method comprising machining an optical workpiece to produce a beam-guiding disk for beam guidance within a beam-guiding device.

27. A method for manufacturing rotational components, by means of a machine assembly as claimed in claim 22 comprising:

providing a workpiece;

holding the workpiece along the axis of rotation of the main spindle;

rotating the workpiece about the axis of rotation by means of the main spindle;

feeding at least one of a first tool of the first tool holding fixture and a second tool of the second tool holding fixture along the axis of rotation in a tool feeding direction into contacting relation with the workpiece; and advancing the workpiece with respect to at least one of the first tool and the second tool in the advancing direction by relative movement of the main spindle with respect to the at least one of the first tool and second.

28. The machine assembly of claim 1 wherein the radially feedable clamping means includes a pressure shell in the form of a clamping bushing configured to receive a pressure medium to fixably secure the workpiece within the rotatable hollow shaft.

29. A machine assembly for use in a manufacturing machine, in particular in a horizontal orientation of an axis of rotation in a horizontal manufacturing machine, comprising:

a fixture carrier;

a motor having a rotatable solid shaft;

a workpiece fixture having a first side and a second side, the workpiece fixture being mounted on the fixture carrier; and a first and a second tool holding fixture, wherein the first tool holding fixture being arranged on the first side of the workpiece fixture and the second tool holding fixture being arranged on the second side of the workpiece fixture; and wherein:

the workpiece fixture has a main spindle with an axis of rotation running from the first to the second side, the main spindle being configured for holding a workpiece along the axis of rotation, the main spindle includes the rotatable solid shaft and the rotatable solid shaft configured to hold the workpiece on the circumference thereof, and the main spindle including at least one of a hydraulic and pneumatic radially feedable clamping pin configured to secure the workpiece to the rotatable solid shaft to provide rotation of the workpiece with rotation of the rotatable solid shaft.

30. The machine assembly of claim 29 wherein the radially feedable clamping means includes a pressure shell comprising a clamping bushing and a clamping pin, wherein the clamping bushing configured to receive a pressure medium and cooperative with the clamping pin to fixably secure the workpiece to the solid shaft.

* * * * *

UNITED STATES PATENT AND TRADEMARK OFFICE
CERTIFICATE OF CORRECTION

PATENT NO. : 10,016,863 B2  
APPLICATION NO. : 14/646762  
DATED : July 10, 2018  
INVENTOR(S) : Eckart Uhlmann et al.

Page 1 of 1

It is certified that error appears in the above-identified patent and that said Letters Patent is hereby corrected as shown below:

On the Title Page

Item (72):  
Delete "Joerg Essman"  
Insert --Jörg Essmann--

Item (73):  
Delete "FRAUNHOFER-GESELLSCHAFT ZUR FORDERUNG DER ANGEWANDTEN FORSCHUNG E.V."  
Insert --FRAUNHOFER-GESELLSCHAFT ZUR FÖRDERUNG DER ANGEWANDTEN FORSCHUNG E.V.--

Item (73):  
Delete "TECHNISCHE UNIVERSITAT BERLIN"  
Insert --TECHNISCHE UNIVERSITÄT BERLIN--

Signed and Sealed this  
Second Day of February, 2021

Drew Hirshfeld  
*Performing the Functions and Duties of the*  
*Under Secretary of Commerce for Intellectual Property and*  
*Director of the United States Patent and Trademark Office*